(12) United States Patent
Sniffen

(10) Patent No.: US 9,710,027 B2
(45) Date of Patent: Jul. 18, 2017

(54) CHASSIS DESIGN AND COMPONENT LAYOUT FOR A MINI-ITX FORMAT COMPUTER

(71) Applicant: Paladin Innovators, Federal Way, WA (US)

(72) Inventor: Joshua Sniffen, Biloxi, MS (US)

(73) Assignee: Paladin Innovators, Federal Way, WA (US)

( * ) Notice: Subject to any disclaimer, the term of this patent is extended or adjusted under 35 U.S.C. 154(b) by 510 days.

(21) Appl. No.: 14/064,081

(22) Filed: Oct. 25, 2013

(65) Prior Publication Data

US 2015/0113794 A1 Apr. 30, 2015
US 2015/0355688 A9 Dec. 10, 2015

Related U.S. Application Data

(60) Provisional application No. 61/719,592, filed on Oct. 29, 2012.

(51) Int. Cl.
*G06F 1/20* (2006.01)
*G06F 1/18* (2006.01)

(52) U.S. Cl.
CPC ............... *G06F 1/20* (2013.01); *G06F 1/186* (2013.01); *Y10T 29/49002* (2015.01)

(58) Field of Classification Search
CPC ................... G06F 1/16; G06F 1/184–1/185
USPC ..................... 361/679.4, 679.47, 679.32
See application file for complete search history.

(56) References Cited

U.S. PATENT DOCUMENTS

| | | | | |
|---|---|---|---|---|
| 4,850,899 A * | 7/1989 | Maynard | ............... | H01R 31/06 439/628 |
| 5,835,346 A * | 11/1998 | Albani | ................ | G06F 1/184 361/679.4 |
| 5,935,227 A * | 8/1999 | Phan | ................ | G06F 1/18 361/679.4 |
| 7,746,630 B2 * | 6/2010 | Tsai | ................ | G06F 1/185 361/679.32 |
| 2003/0212842 A1 * | 11/2003 | Ferguson | ............... | G06F 3/023 710/62 |
| 2005/0227527 A1 * | 10/2005 | Diamond | ............... | G06F 1/184 439/325 |
| 2005/0276015 A1 * | 12/2005 | Wong | ................ | G06F 1/18 361/679.47 |
| 2006/0039120 A1 * | 2/2006 | Young | ................ | G06F 1/20 361/719 |
| 2012/0017246 A1 | 1/2012 | Sniffen | | |
| 2012/0019729 A1 | 1/2012 | Sniffen | | |
| 2012/0300386 A1 * | 11/2012 | Yang | ................ | G06F 1/185 361/679.32 |

* cited by examiner

*Primary Examiner* — Albert Wong
(74) *Attorney, Agent, or Firm* — Shook, Hardy & Bacon, L.L.P.

(57) ABSTRACT

Chassis design and component layout for a mini-ITX format computer are disclosed herein. The essential practice of the design and layout described herein allows for expansion cards and normal size Graphics Processing Unit (GPU) cards in a slim mini-ITX format case. This is achieved through component layout and a special extension cable for the expansion slot on mini-ITX motherboards.

18 Claims, 4 Drawing Sheets

CHASSIS DESIGN AND COMPONENT LAYOUT FOR A MINI-ITX FORMAT COMPUTER

RELATED APPLICATIONS

The present application claims priority from and the benefit of U.S. Provisional Application No. 61/719,592 filed on Oct. 29, 2012 which is herein incorporated by reference.

BACKGROUND

ATX is a computer standard for the size and, to some extent, the layout of consumer motherboards. There are several size standards in ATX, such as large EATX (extended ATX), normal ATX, medium MATX, and small ITX/Mini ATX. Consumers choose a standard to base their system around, choosing more or fewer features at the cost/benefit of size.

Users who select Mini ITX/ATX, the standard for the motherboard in this invention, choose this standard because they want the smallest possible form factor. Maybe they want small boxes for kiosks, home media centers, or a small system they can drag to LAN events. Just because users want or need small, does not mean they want slow. Chassis manufacturers realize this and as a result have split Mini ITX cases into two categories—larger "shoebox" variants that support normal length double slot Graphics Processing Unit (GPU) cards, and truly slim cases that forgo any expansion card.

DETAILED DESCRIPTION OF THE PREFERRED EMBODIMENT

The design and layout described herein allow for normal size GPU cards in a slim case much smaller, sometimes by as much as two-thirds, of shoebox cases. It achieves this through component layout that was reached through extensive testing, computer modeling, and prototyping. The chassis requires a special extension cable for the expansion slot on mini ITX motherboards.

Method for Mini-ITX Chassis Design and Component Layout Using Horizontally Mounted PCI Expansion Slots:

The design of the chassis 10 with the mounting holes for hardware, airflow pressure, and airflow aperture, combined with the layout of the hardware components, allows for a system that is cooled only by component fans. No chassis fans are needed. This arrangement of hardware is unique and cannot be found in any consumer chassis let alone mini-ITX chassis.

Figure 1A:
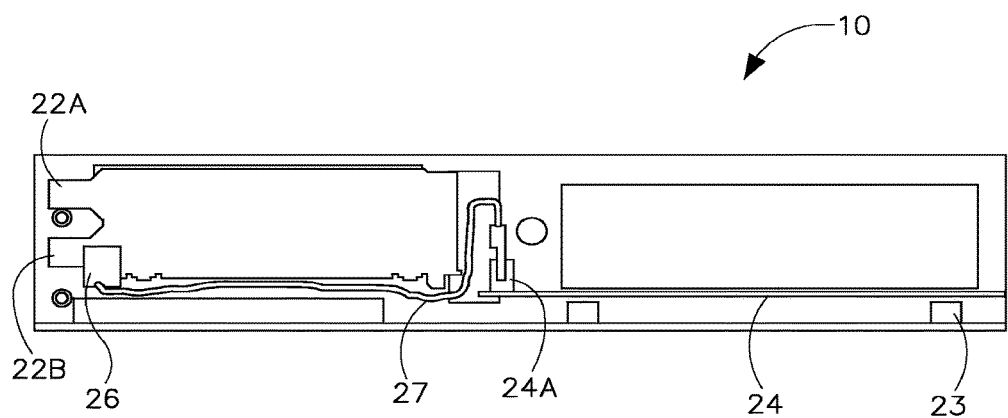
FIG. 1A shows the method of bridging an add-in card with a motherboard using a PCI/PCIE expansion-extension ribbon.
Figure 1B:
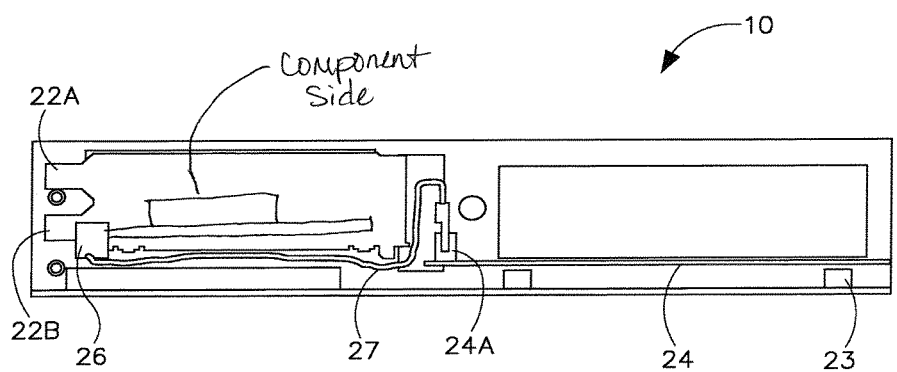
FIG. 1B shows the method of FIG. 1A with the expansion card installed in a B-side orientation.

The two PCI expansion slots 20A and 20B are horizontal in orientation and on the same plane as the I/O interface aperture 21. Uniquely, they are rotated so the PCI key is flipped 180 degrees from "normal" server design—or PCI "A-side" orientation. This flipped orientation will be referred to as "B-side" orientation in this document. FIG. 1B shows an expansion card installed 62 in the "B-side" orientation. To bridge the PCIE keys 22A and 22B on the expansion card 62 with the motherboard's expansion slot 24A, the design requires the use of a PCI A-side adapter 26 and PCI/PCIE expansion-extension ribbon 27 as shown in FIGS. 1A and 1B. This design and layout is the first Mini-ITX specific chassis to use this method of bridging an add-in card with a motherboard 24.

The PCI expansion slots with B-side orientation 20A and 20B allow for an expansion card's heatsink and fan to be on the same plane as the Central Processing Unit (CPU), as shown in FIGS. 1A-1B. This not only allows for less complicated manufacturing of a chassis but allows cool air to be drawn into the fan blades and hot air to be radiated out from heatsinks. Mesh material 28 is used to construct a portion of the chassis. This mesh 28 is 1-5 mm directly above the componentry so very little hot air is trapped. A direct, open mesh design has good cooling properties, but the described Mini-ITX design pushes boundaries and does not have mesh over every part of a component's surface. Instead, some sheet metal 29 is left in place which forces the fans on circuit componentry to draw in cool air from low-heat areas of the case over the heatsinks and radiate out.

In another preferred embodiment, the PCI expansion slots are oriented A-side instead of B-side. While some server chassis do this for network cards, the design described herein is the first and only chassis (currently) to do so with the intent of housing a Graphics Processing Unit (GPU) (not shown) and the first and only chassis to pair this with a Mini-ITX specific chassis/computer case. The reason for this orientation and layout is to gain the benefits of the maximally efficient cooling with the vertical orientation of the chassis, while allowing the use of PCB PCIE "extender" boards (not shown), which provides a cost advantage over alternative extender board formats.

Figure 2:
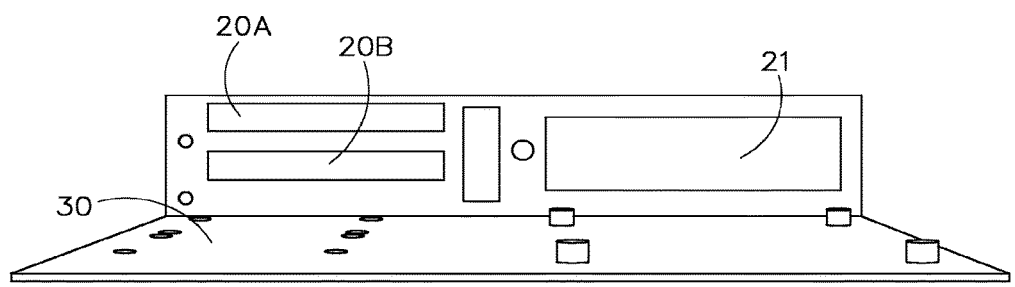
FIG. 2 shows the bottom/rear chassis section without components installed.
Figure 3:
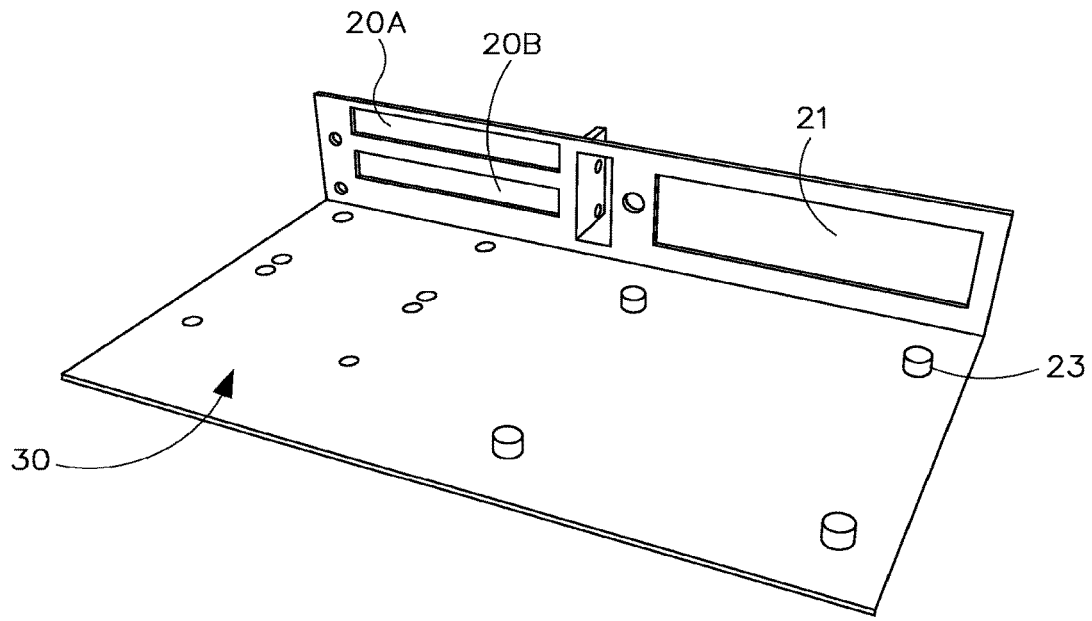
FIG. 3 shows the layout of the chassis mounting provisions.

Method for Mounting Components within a Computer Chassis:

The unique design and layout allows for the components to be mounted in a way that is unique to all consumer chassis, including Mini-ITX chassis. The horizontal B-Side layout (as shown in FIG. 1B) of the two PCI ATX Compliant keys 22A and 22B are located in the same plane as the I/O aperture 21 for the motherboard back panel as seen in FIG. 2. They are in close proximity to the power connectors for the internal Power Supply Unit (PSU). There are four standoff mounts 23 for the motherboard 24 adjacent the I/O aperture 21. The 2.5" drive mounts 30 are located under the expansion slots as shown in FIG. 3. An added benefit of this approach is a reduction in parts for manufacturing. The slim optical drive mounts trade with the 2.5" drives and allow for a combination of one optical and one or two 2.5" drives. If both PCI slots are not available then an optional 2.5" mounting system can be installed to allow for more drives.

Figure 4:
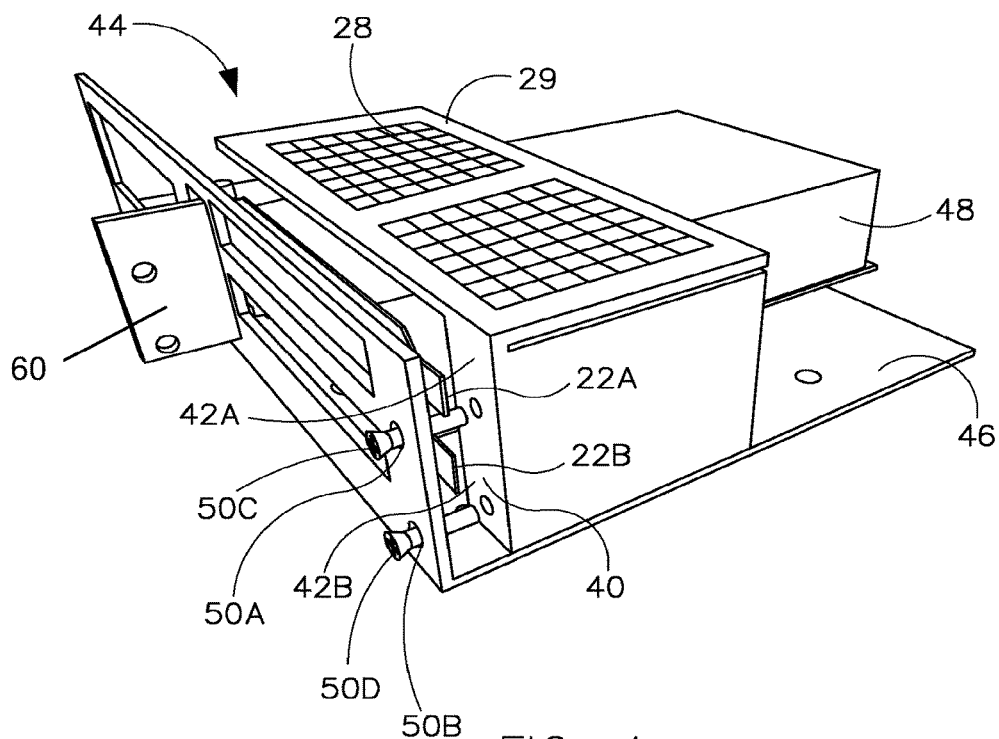
FIG. 4 shows a side, cut-away view of how the top chassis piece sandwiches an installed PCI card-card with the outer base chassis piece.
Figure 5:
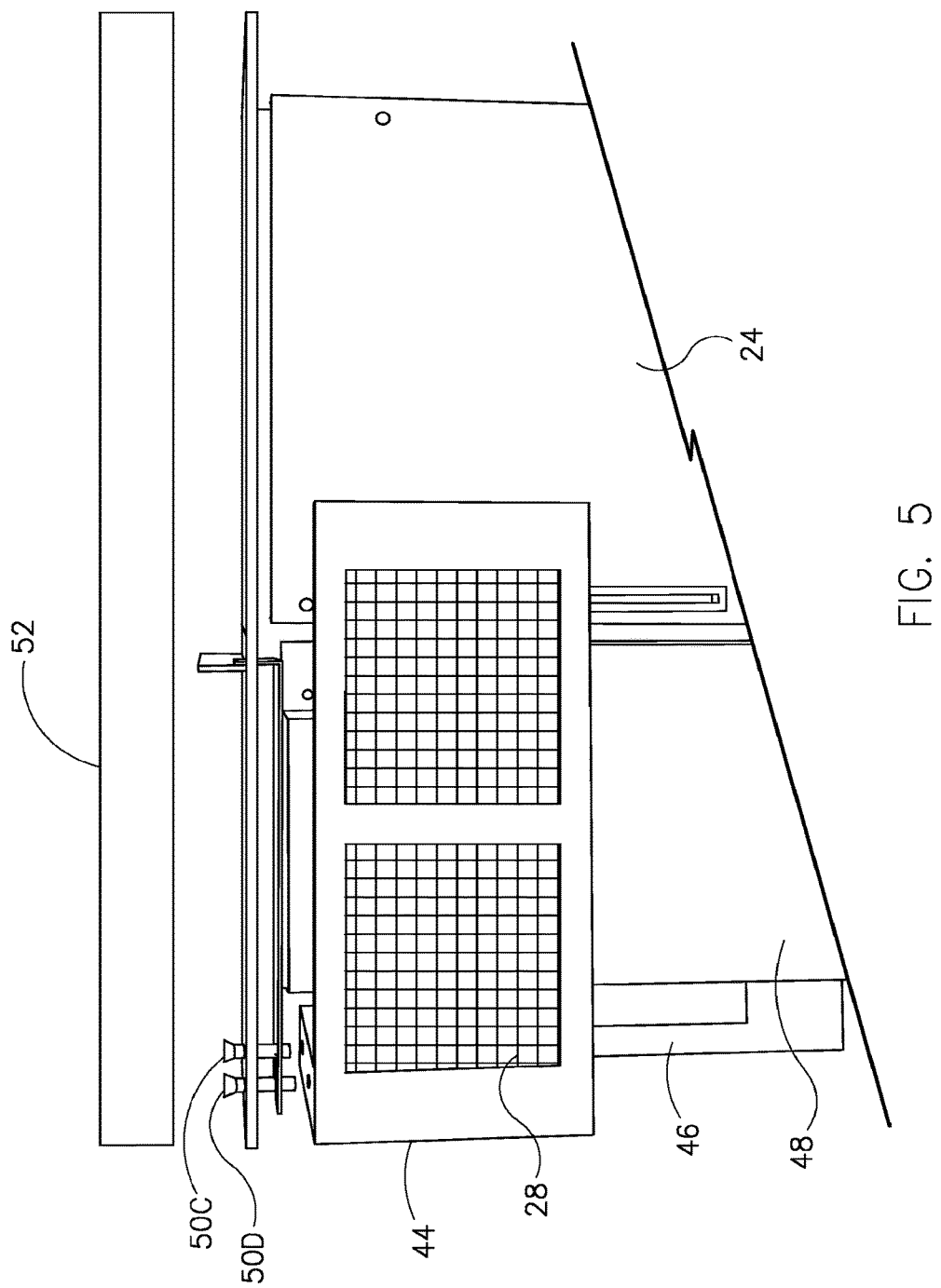
FIG. 5 shows a top, cut-away view of how the top chassis piece sandwiches an installed PCI card-card with the outer base chassis piece.

Method for Mounting and Securing ATX-Compliant Expansion Cards:

The unique design and layout allow for the chassis walls themselves to house and secure PCI keyed ATX-compliant expansion cards 48. The base chassis piece 46 has the threaded tab 40 and two slots 42A and 42B for the two PCI keys 22A and 22B. The top chassis piece 44 and outer base chassis piece 46 sandwich either two installed single-slot PCI expansion cards (not shown), or one double-slot expansion card 48, as shown in FIGS. 4 and 5. Furthermore, two pass through holes 50A and 50B on the outer base chassis piece allow for screws 50C and 50D to mate with the top chassis piece and sandwich the PCI keyed ATX-compliant expansion card key(s) 22A and 22B to prevent lateral movement of the expansion card(s) 48. This unique method saves on tooling costs and keeps tabs from slipping out and damaging PCI cards during shipping.

Method for Three-Piece Chassis Design:

The unique chassis design assembles with only three manufactured pieces, the top chassis piece 44, the outer base chassis piece 46, and the decorative front bezel piece 52, as shown in FIG. 5. Two of these pieces are bent sheet-metal and one of these is made from milled metal. The rigidity of the structure is attributed to the front bezel 52 which is milled from a block of metal and acts as the spine of the chassis 10. This bezel 52 secures to the base chassis piece 46 with screws, and the top chassis piece 44 secures to the bottom chassis piece with screws 50C and 50D. The top chassis piece has pressed in, pin-nuts (not shown), and mate with corresponding holes on the front chassis bezel. FIG. 4 also shows a mounting tab 60 located between I/O interface aperture 21 and PCI expansion slots 20A/20B.

While the preferred embodiment has been illustrated and described, as noted above, many changes can be made without departing from the spirit and scope of the invention. Accordingly the scope of the invention is not limited by the disclosure of the preferred embodiment.

The embodiments of the invention in which an exclusive property or privilege is claimed are defined as follows:

1. A mounting configuration for a mini ITX/ATX motherboard and a PCI keyed ATX-compliant expansion card, comprising:
   (a) a chassis, having a first planar rigid web section and a second planar rigid web section, perpendicular to said first planar rigid web section, said second planar rigid web section defining a first rectangular opening, having a greater extent in a first dimension than in a second dimension, and a pair of second rectangular openings displaced in said first dimension from said first rectangular opening and displaced in said second dimension from each other, wherein said second planar rigid web section includes a mounting tab located between said first rectangular opening and said pair of second rectangular openings;
   (b) said mini ITX/ATX motherboard attached located substantially parallel to said first planar rigid web section proximal to said first rectangular opening and having an expansion slot positioned proximal to said second rectangular openings;
   (c) said PCI keyed ATX-compliant expansion card attached to said mounting tab on said second planar rigid web section, first planar rigid web section proximal to said pair of second rectangular openings, and further defining occupying at least one expansion slot aligned to one of said second rectangular openings, and further including a PCI adapter, on a side of said expansion card furthest from said motherboard such that the PCI keyed ATX-compliant expansion card has a B-side orientation; and
   (d) a PCI expansion ribbon cable connecting said expansion slot to said PCI adapter.

2. The configuration of claim 1, wherein said PCI keyed ATX-compliant expansion card defines two expansion slots, each one aligned to one of said pair of second rectangular openings.

3. The configuration of claim 1, wherein said PCI keyed ATX-compliant expansion card includes a fan and is oriented so that said fan is parallel to the motherboard and positioned closer to the second planar rigid web section than the first planar rigid web section, thereby permitting said fan to draw cool air through said second planar rigid web section, when it is activated.

4. The configuration of claim 1, wherein said PCI keyed ATX-compliant expansion card includes a heatsink and is oriented so that said heatsink is parallel to the mini ITX/ATX motherboard and positioned closer to the second planar rigid web section than the first planar web section.

5. The configuration of claim 4, wherein said PCI keyed ATX-compliant expansion card further includes a fan that is oriented so that said fan is disposed between the heatsink and the second planar rigid web section.

6. The configuration of claim 1, wherein the motherboard conforms to the Mini ITX form factor.

7. The configuration of claim 1, wherein the mounting configuration is cooled only by component fans and without chassis fans.

8. The configuration of claim 6, wherein the motherboard comprises a PCI expansion slot, and wherein a PCI/PCIE expansion-extension ribbon connects the PCI expansion slot with the PCI adapter.

9. The configuration of claim 1, wherein the PCI keyed ATX-compliant expansion card is a graphic processing unit.

10. A mounting configuration for a mini ITX/ATX motherboard and PCI keyed ATX-compliant expansion card, comprising:
    (a) a chassis comprising first web section, a second web section, and a bezel piece, wherein the rigidity of the chassis is attributed to the bezel piece, and wherein the bezel piece defines a first rectangular opening and a pair of second rectangular openings, wherein said second web section includes a mounting tab located between said first rectangular opening and said pair of second rectangular openings;
    (b) said mini ITX/ATX motherboard attached located substantially parallel to said first web section proximal to said first rectangular opening and having an expansion slot positioned proximal to said second rectangular openings, wherein said mini ITX/ATX motherboard further comprises a PCI expansion slot;
    (c) said PCI expansion card attached to said mounting tab on said second web section; at least one of the second rectangular openings;
    (d) a PCI adapter connecting the PCI keyed ATX-compliant expansion card to the PCI expansion slot of the motherboard, and wherein the PCI adapter is connected to the PCI expansion card on a side of said PCI keyed ATX-compliant expansion card furthest from the motherboard such that the PCI expansion card has a B-side orientation.

11. The configuration of claim 10, further comprising a PCI expansion ribbon cable connecting said expansion slot to the PCI adapter.

12. The configuration of claim 10, wherein the pair of second rectangular openings defines two expansion slots oriented so that the PCI keyed ATX-compliant expansion card is parallel with the motherboard.

13. The configuration of claim 10, wherein the PCI keyed ATX-compliant expansion card includes a fan and is oriented so that the fan is parallel to the mini ITX/ATX motherboard and positioned closer to the second planar rigid web section than the first planar rigid web section, thereby permitting the fan to draw cool air through said second web section when it is activated.

14. The configuration of claim 10, wherein said PCI keyed ATX-compliant expansion card includes a heatsink and is oriented so that said heatsink is parallel to the mini ITX/ATX motherboard and positioned closer to the second web section than the first web section.

15. The configuration of claim 14, wherein said PCI keyed ATX-compliant expansion card further includes a fan that is oriented so that said fan is disposed between the heatsink and the second web section.

16. The configuration of claim 10, wherein the motherboard conforms to the Mini ITX form factor.

17. The configuration of claim 10, wherein the mounting configuration is cooled only by component fans and without chassis fans.

18. The configuration of claim 10, wherein the PCI expansion card is an ATX-compliant graphic processing unit.

* * * * *